United States Patent
Mullican (10) Patent No.: US 7,959,174 B2
(45) Date of Patent: Jun. 14, 2011

(54) AIR SPRING/COIL SPRING COMBINATION SUSPENSION SYSTEM

(75) Inventor: Vernon Jeffrey Mullican, Visalia, CA (US)

(73) Assignee: TLC Suspensions, LLC, Santa Monica, CA (US)

(*) Notice: Subject to any disclaimer, the term of this patent is extended or adjusted under 35 U.S.C. 154(b) by 525 days.

(21) Appl. No.: 11/281,606

(22) Filed: Nov. 18, 2005

(65) Prior Publication Data
US 2006/0103102 A1 May 18, 2006

Related U.S. Application Data

(60) Provisional application No. 60/629,682, filed on Nov. 18, 2004.

(51) Int. Cl.
*B60G 11/56* (2006.01)
(52) U.S. Cl. .................. 280/124.162; 267/221
(58) Field of Classification Search .......... 280/5.514, 280/5.515, 6.159, 124.162, 124.165, 124.168, 280/124.179; 267/34, 195, 217, 221, 259
See application file for complete search history.

(56) References Cited

U.S. PATENT DOCUMENTS

| | | | | |
|---|---|---|---|---|
| 1,055,734 A * | 3/1913 | Funk | | 267/34 |
| 1,111,675 A * | 9/1914 | Rayson | | 267/33 |
| 1,961,634 A * | 6/1934 | Faunton | | 267/34 |
| 2,023,135 A * | 12/1935 | Hawkins | | 267/64.23 |
| 2,030,263 A * | 2/1936 | Mercer, Jr. | | 280/124.179 |
| 2,145,891 A * | 2/1939 | Rice, Jr. | | 267/34 |
| 2,441,629 A * | 5/1948 | Hahn | | 267/221 |
| 2,711,315 A * | 6/1955 | Mosebach | | 267/64.27 |
| 2,715,023 A * | 8/1955 | Nallinger | | 267/64.16 |
| 2,989,301 A * | 6/1961 | Johannsen | | 267/34 |
| 3,054,624 A * | 9/1962 | Nallinger | | 280/104 |
| 3,178,167 A * | 4/1965 | Loewis | | 267/64.21 |
| 3,287,025 A * | 11/1966 | Garcea et al. | | 280/6.159 |
| 3,552,767 A * | 1/1971 | Yew et al. | | 280/6.159 |
| 3,572,676 A * | 3/1971 | Yew | | 267/34 |
| 3,598,422 A * | 8/1971 | Strauff | | 280/124.162 |
| 3,632,130 A * | 1/1972 | Novotny | | 280/6.159 |
| 3,690,689 A * | 9/1972 | Fannin et al. | | 280/6.159 |
| 3,727,899 A * | 4/1973 | Pemberton | | 267/34 |
| 3,754,768 A * | 8/1973 | Ellis et al. | | 280/6.158 |
| 3,810,650 A * | 5/1974 | Hudson | | 280/124.159 |
| 3,966,223 A * | 6/1976 | Carr | | 280/124.128 |

(Continued)

FOREIGN PATENT DOCUMENTS

JP 2001121936 A * 5/2001

(Continued)

*Primary Examiner* — Paul N Dickson
*Assistant Examiner* — Laura Freedman
(74) *Attorney, Agent, or Firm* — Kelly Lowry & Kelley, LLP; Scott W. Kelley (57) ABSTRACT

A suspension system for a vehicle includes a plurality of spring assemblies, each spring assembly including, in combination, a coil spring and an air spring arranged around a common central axis, and being mounted above the rear axle of the vehicle. A method for improving a vehicle's ride, handling, and load-carrying capability includes providing the foregoing suspension system for which respective coil springs are positioned within respective housings; partially inflating respective air springs thereby causing respective coil springs to partially collapse into their housings when improvement to the ride is desired in combination with improvement in load-carrying ability; and completely inflating respective air springs thereby causing respective coil springs of the plurality of spring assemblies to substantially completely collapse into their housings when maximum load-carrying ability is desired.

20 Claims, 6 Drawing Sheets

U.S. PATENT DOCUMENTS

| | | | | |
|---|---|---|---|---|
| 4,711,464 A | * | 12/1987 | Bilas | 280/86.5 |
| 4,736,931 A | * | 4/1988 | Christopherson | 267/34 |
| 4,783,089 A | * | 11/1988 | Hamilton et al. | 280/6.157 |
| 4,828,237 A | * | 5/1989 | Neff | 267/221 |
| 4,830,395 A | * | 5/1989 | Foley | 280/124.162 |
| 4,909,535 A | * | 3/1990 | Clark et al. | 280/5.515 |
| 5,346,246 A | * | 9/1994 | Lander et al. | 280/124.157 |
| 5,401,053 A | * | 3/1995 | Sahm et al. | 280/5.502 |

FOREIGN PATENT DOCUMENTS

| | | | | |
|---|---|---|---|---|
| JP | 2003146042 A | * | 5/2003 | |

* cited by examiner

AIR SPRING/COIL SPRING COMBINATION SUSPENSION SYSTEM

CROSS-REFERENCE TO RELATED APPLICATION

This Application for U.S. Letters Patent claims the benefit of the priority of Provisional Application No. 60/629,682 filed Nov. 18, 2004, the disclosure of which is incorporated herein by reference.

BACKGROUND OF THE INVENTION (1) Field of the Invention

This invention relates to suspension systems for vehicles. As used herein, the terms "vehicle" and "vehicles" are intended to include but not be limited to passenger cars, sport utility vehicles, pick-up trucks, commercial trucks, buses, vans, recreational vehicles, motor homes, farm equipment, and non-motorized trailers that carry horses, boats, cars and other loads.

(2) Description of the Related Art

Since the advent of vehicles numerous suspension systems have been devised to improve the ride of the vehicle not only for the comfort of the occupants but also for maintaining the structural integrity and aesthetics of the contents by providing sufficient lift capability, vehicle stability, and improved handling. For example, motorized vehicles in use since the early 1900s have used simple leaf spring rear suspension systems as have certain non-motorized vehicles such as trailers. Indeed, a substantial number of modern vehicles including by way of example but not limitation pick-up trucks, vans, sport utility vehicles, commercial trucks, and trailers continue to use simple leaf spring rear suspension systems.

In addition to simple leaf spring rear suspension systems, air springs have long been used in various suspension systems in a variety of vehicle types. In known suspension systems employing air springs, the air springs are firmly attached to supporting members of the vehicle at the top and bottom sections of the air springs. These systems typically require very high air pressure which causes the air springs, and hence the ride, to be stiff. While systems employing air springs provide additional lift advantageous for carrying or towing heavy loads, the stiffness of the ride is generally perceived as reducing the comfort of the occupants. Thus, air spring suspension systems provide lift when heavily loaded but at the expense of the comfort of the occupants which may not be justified during operation of the vehicle without heavy loads.

Various aftermarket devices have been developed to provide increased lift capability and stability of a vehicle when carrying heavy loads. Generally, suspension systems strong enough to provide sufficient lift when loaded make the ride stiffer during unloaded operation, while suspension systems that don't interfere with unloaded operation may not be strong enough to provide sufficient lift when loaded. Additionally, there is often insufficient space in most vehicles for more than one suspension system. While some systems are quite simple and easily added to existing vehicles, others require significant modifications to the standard "original equipment manufacturer" (OEM) product and/or require complicated installation.

Accordingly, it is an object of the present invention to improve the ride and load-carrying capabilities of existing vehicles with an easy-to-install retrofit suspension system that does not interfere with the factory installed suspension system of the vehicle. The same system can also be integrated into new vehicles to improve ride, handling, and load-carrying capabilities.

It is a further object of the invention to improve ride, handling, and load-carrying capabilities of vehicles having one of a straight rear axle or an independent rear suspension by installing a suspension system as a retrofit device or as an OEM product.

It is yet another object of the invention to provide a method for improving ride and load-carrying capability of a vehicle.

SUMMARY OF THE INVENTION

These and other objects are accomplished by the present invention, which provides a suspension system for a vehicle having a rear axle, comprising a plurality of spring assemblies, each spring assembly of the plurality of spring assemblies being comprised of, in combination, a coil spring and an air spring arranged around a common central axis, and being mounted above the rear axle of the vehicle. The inventive suspension system may be sold in the aftermarket as an unassembled kit of parts used as an additional suspension system together with the vehicle's existing suspension system or be installed as original equipment by the manufacturer.

The suspension system advantageously further comprises attachment means for joining the coil spring and the air spring of respective spring assemblies, and rear axle mounting means for one of (a) retaining the coil spring of respective spring assemblies in substantial alignment with the central axis and mounting the coil spring of respective spring assemblies above the rear axle or (b) mounting the air spring above the rear axle.

The air spring may comprise an inflatable section, top and bottom structural plates positioned at opposite ends of the inflatable section in opposition to one another and having a plurality of holes provided therein, and an air fitting for inflation and deflation. Then, the attachment means comprises an attachment plate assembly positioned between the coil spring and the air spring of respective spring assemblies for joining the coil spring and the air spring. The attachment plate assembly may comprise an attachment plate to which one said structural plate of the air spring is attached and to which the coil spring is attached. Then, the suspension system advantageously further comprises a coil spring retainer positioned between the attachment plate and the coil spring of respective spring assemblies for attaching the coil spring to the attachment plate, wherein the coil spring retainer is fixedly connected to the attachment plate, and wherein the coil spring retainer engages the coil spring and urges the coil spring against the attachment plate so that the coil spring and the air spring of respective spring assemblies are joined.

In a variation of the foregoing embodiment of the attachment plate assembly, the attachment plate assembly comprises a pair of opposed attachment plates including an air spring attachment plate to which one said structural plate of the air spring is attached and a coil spring attachment plate to which the coil spring is attached, said opposed attachment plates being spaced apart and joined by connection means. Then the suspension system advantageously further comprises a coil spring retainer positioned between the coil spring attachment plate and the coil spring of respective spring assemblies for attaching the coil spring to the coil spring attachment plate, wherein the coil spring retainer is fixedly connected to the coil spring attachment plate, and wherein the coil spring retainer engages the coil spring and urges the coil spring against the coil spring attachment plate so that the coil spring and the air spring of respective spring assemblies are joined.

The coil spring retainer in either of the foregoing embodiments of the attachment plate assembly has a profile which engages the coil spring and the coil spring retainer is fixedly connected to the attachment plate by at least one connection means so that the coil spring retainer urges the coil spring against the attachment plate. The coil spring retainer may be a bar having a profile which is one of crimped or bent for engaging the coil spring.

The rear axle mounting means retains the coil spring of respective spring assemblies in substantial alignment with the central axis and mounts the coil spring of respective spring assemblies above the rear axle. The rear axle mounting means comprises a coil spring housing configured to accept at least a portion of the coil spring therein and provide substantial alignment of the coil spring with the central axis, a platform onto which the coil spring housing is positioned and attached, and a platform support positioned over the rear axle and removably connected thereto and connected to the platform so that the coil spring of respective spring assemblies are mounted above the rear axle.

In an alternate embodiment, the rear axle mounting means mounts the air spring above the rear axle and comprises a platform onto which the air spring is attached and a platform support positioned over the rear axle and removably connected thereto and connected to the platform so that the air spring of respective spring assemblies are mounted above the rear axle.

In either of the foregoing embodiments, a long bolt and shackle means removably connecting the platform support to the rear axle for respective spring assemblies may be provided and may comprise a plurality of long bolts, a plurality of shackles and a plurality of nuts.

The suspension system additionally includes an upper support bracket positioned between the bed support channel and the plurality of spring assemblies and attached to the bed support channel and to the plurality of spring assemblies by respective mounting means.

The suspension system may be a retrofit system comprising a kit of parts in a packing container.

Particularly in a vehicle having a rear axle and one of a leaf spring, coil spring, strut, or independent suspension, an additional suspension system according to the present invention provides an improvement. Thus, the present invention provides an improvement comprising an additional suspension system comprised of a plurality of spring assemblies, each spring assembly of the plurality of spring assemblies being comprised of, in combination, a coil spring and an air spring arranged around a common central axis, and being mounted over the rear axle of the vehicle.

These and other objects of the invention are accomplished by the present invention which additionally provides a method of improving ride and load-carrying capability of a vehicle, comprising providing a vehicle having an undercarriage and a rear axle with a suspension system comprised of a plurality of spring assemblies, each spring assembly of the plurality of spring assemblies being comprised of, in combination, a coil spring attached to an air spring arranged around a common central axis, and being mounted above the rear axle of the vehicle, respective coil springs of the plurality of spring assemblies being positioned within respective housings; partially inflating respective air springs of the plurality of spring assemblies thereby causing respective coil springs of the plurality of spring assemblies to partially collapse into their housings when improvement to the ride is desired in combination with improvement in load-carrying ability; and completely inflating respective air springs of the plurality of spring assemblies thereby causing respective coil springs of the plurality of spring assemblies to substantially completely collapse into their housings when maximum load-carrying ability is desired.

DETAILED DESCRIPTION OF THE INVENTION

The present invention's combination of an air spring and a coil spring arranged around a common central axis is considered novel, useful as described in the following, and not obvious from the prior art.

Figure 1:
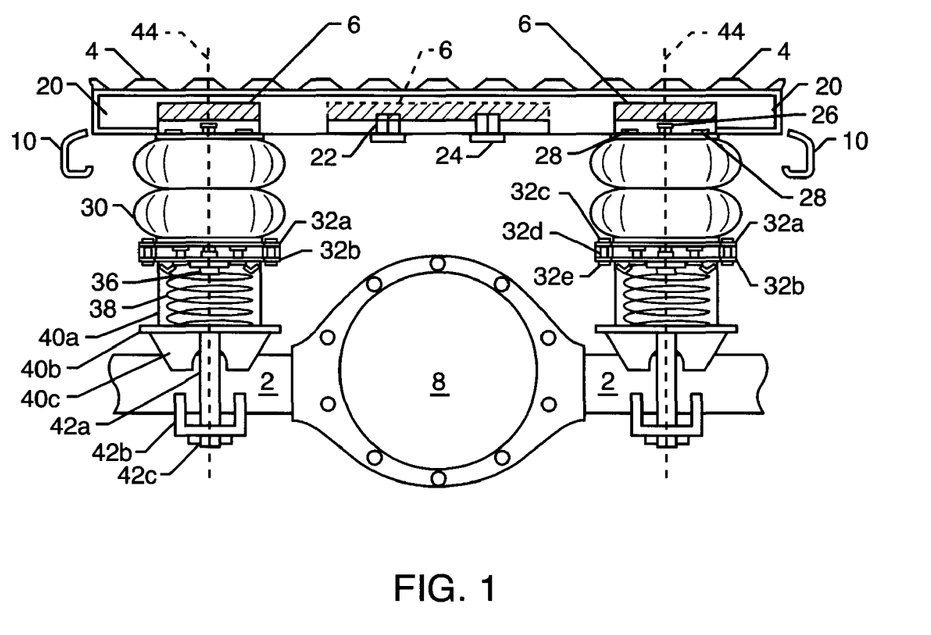
FIG. 1 is an elevational view of one embodiment of the suspension system according to the invention viewed from the rear of a vehicle with an upper support bracket partially absent.

The gist of the invention is the unique use of air springs 30 and coil springs 38 in combination arranged around central axis 44 as shown in FIG. 1. While air springs and coil springs are known from the suspension prior art, no one has disclosed using these divergent systems in combination for the advantages described herein.

Figure 2A:
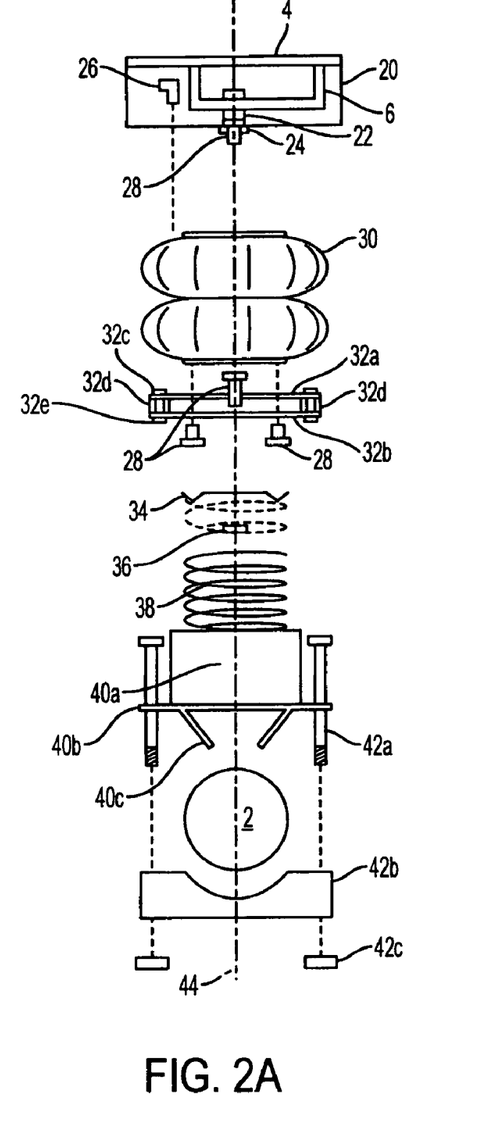
FIG. 2A is an exploded schematic side view of the embodiment of the suspension system of FIG. 1 with undercarriage frame absent.
Figure 2B:
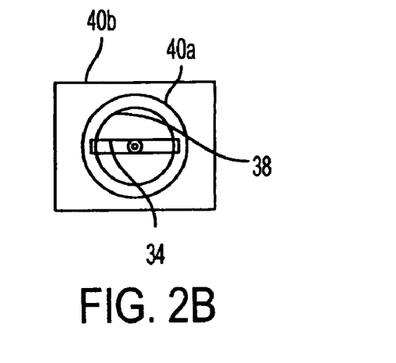
FIG. 2B is a breakaway top view from FIG. 2a of the coil spring housing and platform assembly, coil spring retainer and coil spring according to the invention.

With reference to FIGS. 1, 2A and 2B, coil springs 38 and air springs 30 when slightly inflated may provide cushioning alone or in addition to a vehicle's suspension system, for example, a leaf spring suspension system, with normal driving loads. As shown in FIG. 1, when an additional load is present and is being carried or towed, air springs 30 may be inflated for this purpose and in proportion to the load, coil springs 38 and attachment plates 32b, 32c collapse into coil spring housings 40a, platforms 40b, platform supports 40c and the additional load weight is transferred to air springs 30. The inventive suspension system thus advantageously provides occupants with the more comfortable ride characteristic of a suspension system including coil springs and air springs under low load conditions while providing progressively additional lift capability advantageous for carrying or towing progressively heavier loads when appropriate and at the option and under the control of the occupants. Occupants thus may progressively increase the pressurization of the air springs to provide a desired level of additional lift for the load and a desired level of perceived stiffness of the ride.

Vehicles with different weights may require different size and strength air springs 30, coil springs 38, upper support bracket 20, coil spring retainers 34, coil spring housings 40*a*, platforms 40*b* and platform supports 40*c*.

Useful air springs 30 may be selected based on their weight rating as is known in the prior art. For example, in a preferred embodiment for pick-up trucks, such as the Chevrolet Silverado, Ford F-150, Dodge RAM 1500, and other vehicles based on similar chassis, 9-inch double convoluted air springs rated to carry as much as 10,000 pounds each are available from Goodyear Tire and Rubber Company, Model 2B9 200; Firestone Model WO1-358-6910. Conventional air springs 30 include inflatable sections 30*a* and upper and lower structural plates 30*b* shown most clearly in FIG. 7. The air spring disclosed in U.S. Pat. No. 6,511,046 may also be useful and is included herein.

Useful coil springs 38 may be similarly selected as is known in the prior art. For example, in a preferred embodiment for pick-up trucks, such as the Chevrolet Silverado, Ford F-150, Dodge RAM 1500, and other vehicles based on similar chassis, coil springs having about a 4.7 inch outside diameter (OD) with a weight rating ranging from about 50 to 100 pounds per inch are useful and their length may be selected depending on the space available under the vehicle, such as lengths ranging from about 5 to about 8 inches.

As shown in FIG. 1, an upper support bracket 20 is provided and is mounted to the underside of the vehicle directly over rear axle 2 in a manner that depends upon the configuration of the underside of the vehicle and may be attached by any various attachment means, by way of example but not limitation, by using bolts, screws or welding. As an example by way of illustration but not limitation, a useful upper support bracket 20 may be made of about 10 gauge steel, may be about 4 to about 8 inches wide and about 24 to about 48 inches long in a square "C" shape that fits over the outside of bed support channels 6 existing on, for example, a Chevrolet Silverado and other vehicles, and engages bed support channel 6 and vehicle bed 4 of the vehicle as shown in FIG. 1.

In the embodiment shown in FIG. 1, upper support bracket 20 is secured to the underside of the vehicle with two self-drilling screws 24 of sufficient length inserted into the bed support channel 6 as shown. A metal spacer 22 is positioned over each self-drilling screw 24 and between upper support bracket 20 and bed support channel 6 as shown in FIG. 1. Alternatively, upper support bracket 20 may attached securely to the bottom of a vehicle, directly over rear axle 2, and may have a different shape which accommodates the design of the specific vehicle. Instead of being attached to a vehicle's bed support channels 6, upper support bracket 20 may be installed using bolts, washers, and nuts that run through holes drilled into and through truck bed 4 according to another embodiment of the invention which has not been illustrated separately since it is a minor variation of FIG. 1.

With further reference to FIGS. 1 and 2A, two air springs 30 are attached to upper support bracket 20 directly over rear axle 2 using bolts 28. FIG. 2A is an exploded schematic side view of the embodiment of the suspension system of FIG. 1 with undercarriage frame 10 absent. Conventional air springs 30 include inflatable sections 30*a* and upper and lower structural plates 30*b* shown most clearly in FIG. 7. Attachment of air springs 30 to upper support bracket 20 is made via the upper structural plate 30*b* which is provided with suitable holes. The position and number of bolts 28 may vary depending upon the specific configuration of air springs 30 and their structural plates 30*b*. As shown in FIGS. 1 and 2, an orifice is provided in upper support bracket 20 for an air fitting 26 to allow for air input and exhaust from each air spring 30. Air lines may be run through upper support bracket 20 and connected to a manual valve or a commercially available air compressor such as at a filling station (not shown).

Coil springs 38 must be firmly attached to air springs 30 and there are various useful methods for doing so contemplated within this invention as an artisan would appreciate. Coil springs 38 may simply be welded directly to the structural plate 30*b* of air springs 30 or may be welded to a plate attached to air springs 30 (not shown). Manufacturing cost considerations will dictate which version is sold; all perform well.

In the advantageous embodiment shown in FIGS. 1 and 2A herein, an attachment plate assembly is used that consists of an air spring attachment plate 32*a*, a coil spring attachment plate 32*b*, attachment plate bolt 32*c*, attachment plate spacer 32*d* and attachment plate nut 32*e*. By way of illustration but not limitation, attachment plates 32*a* and 32*b* may have a square shape of about six inches on each side and be made of steel having a thickness of about 1/16 inch steel. However, the invention contemplates use of any suitable shape and material for attachment plates 32*a* and 32*b* that would be functionally satisfactory.

Figure 3:
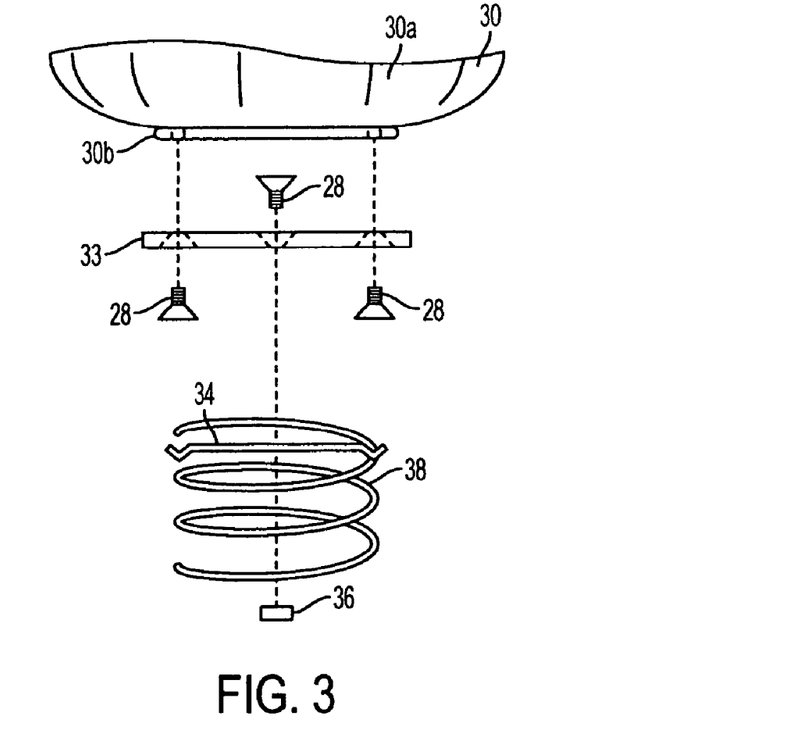
FIG. 3 is an exploded schematic view of another embodiment of the invention which employs a single attachment plate for attaching the air spring to the coil spring in place of the double attachment plate embodiment shown in FIG. 1.
Figure 4:
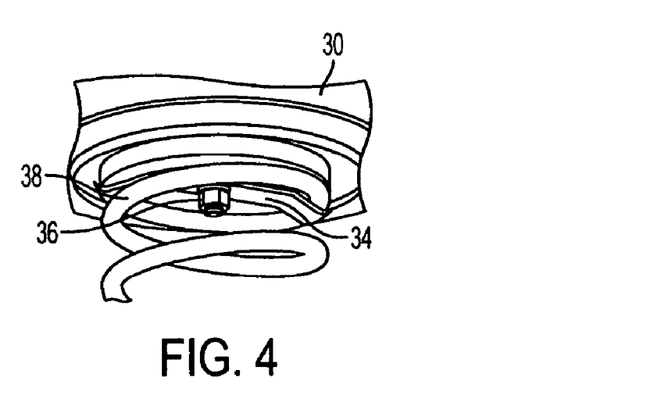
FIG. 4 is a partial isometric view showing the coil spring and the air spring of FIG. 3 after attachment.
Figure 7:
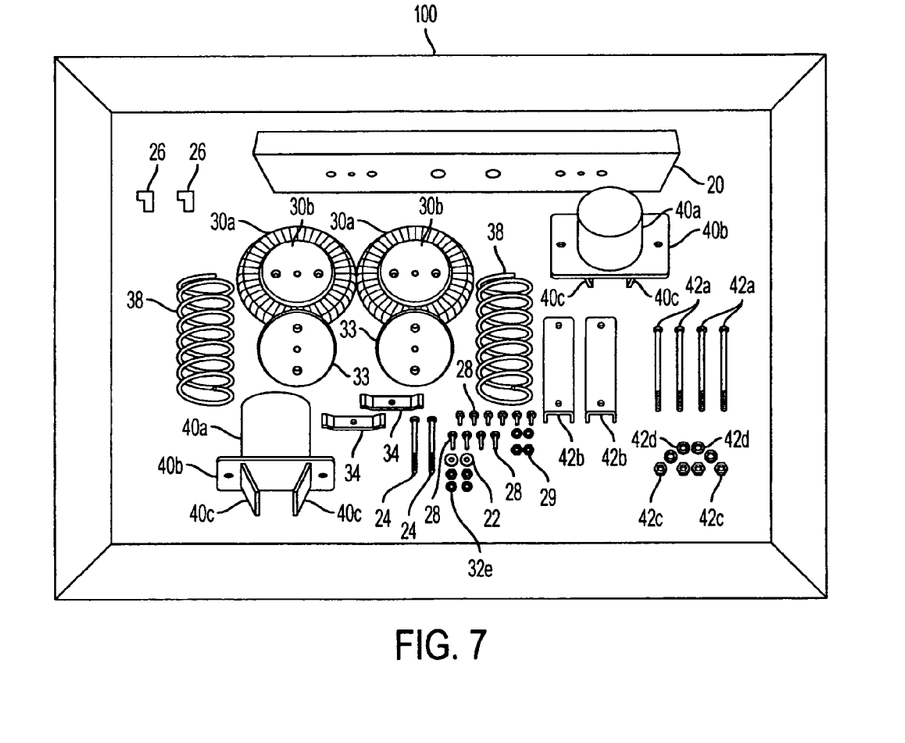
FIG. 7 is a kit of parts in a packing container of the embodiment of FIG. 3 of a suspension system according to the invention prior to being assembled and mounted in a vehicle.

Attachment plates 32*a* and 32*b* can be attached together by various methods such as, by way of illustration but not limitation, four attachment plate bolts 32*d* and four attachment plate nuts 32*e* (one bolt 32*d* and one nut 32*e* on each corner of attachment plates 32*a* and 32*b*) and four attachment plate spacers 32*c* placed over bolt 32*d* and between attachment plates 32*a* and 32*b*, and having a thickness of about 1/2-inch. The invention additionally contemplates embodiments in which the two attachment plates 32*a* and 32*b* are replaced by a single attachment plate 33 as shown in FIGS. 3, 4, and 7, or similar arrangements. While FIGS. 3, 4, and 7 show single attachment plate 33 as a circular plate provided with three holes for attachment of plate 33 to air spring 30 via a lower structural plate 30*b*, and attachment of plate 33 to coil spring 38 via retainer 34 using bolt 28 and nut 36, the invention contemplates single attachment plates 33 having other shapes and employing other attachment means. Such modifications in shape, and attachment means are within the present invention.

FIGS. 1 and 2A show air spring attachment plate 32*a* attached to air spring 30 with bolts 28 and show coil spring attachment plate 32*b* attached to coil spring 38 with the use of coil spring retainer 34, bolt 28, and coil spring retainer nut 36. Coil spring retainer 34 may have the configuration shown in FIGS. 2A, 2B, 3 and 4 which show a bar provided with a hole for attachment and v-grooves, i.e., crimps, on either end which engage sections of coil spring 38. Coil spring retainer 34 may have alternate configurations, such as the configuration shown in FIG. 5, where a bar provided with a hole for attachment and bent, i.e., elevated, ends for engagement of sections of coil spring 38 is shown.

Figure 5:
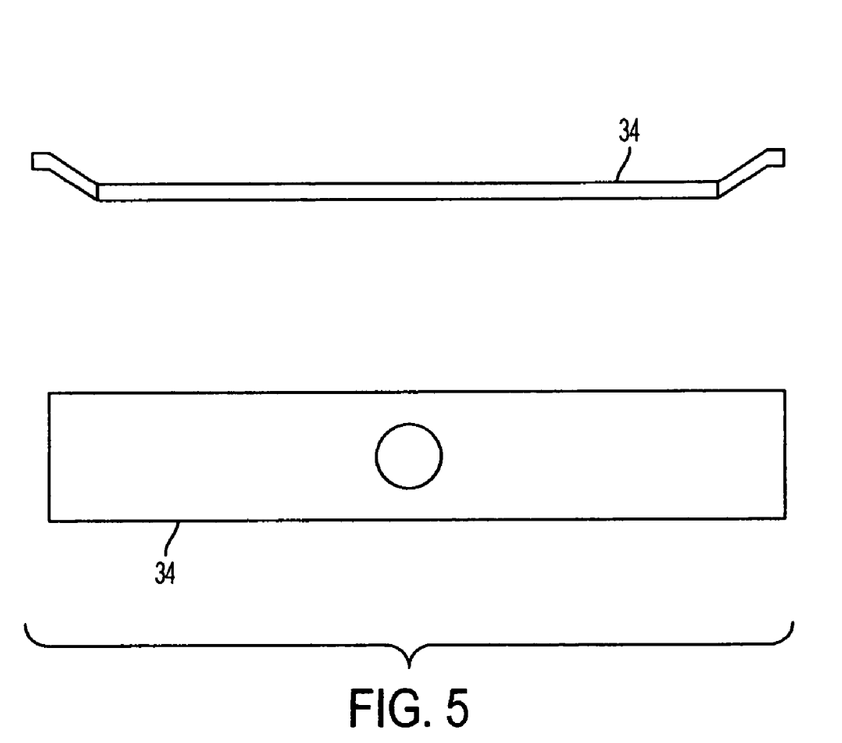
FIG. 5 is a planar side view and a planar top view of a coil spring retainer according to another embodiment of the invention.

Coil spring retainer 34 may be a thin piece of metal having a thickness of about 3/16 inch and a width of about 1 inch, and may be crimped and/or bent at each end so that a flat portion of coil spring 38 can fit inside the space created by the crimped and/or bent end (see FIGS. 3, 4 and 5). Coil spring retainer 34 may have other shapes that would serve the same function. While FIGS. 1, 2A, 3 and 4 show coil spring retainer 34 having a double crimp, in an advantageous embodiment, coil spring retainer 34 has a single crimp and coil spring 38 is ground flat at the ends. In any event, coil spring 38 is held in place when coil spring retainer 34 is attached to coil spring attachment plate 32b or single attachment plate 33 using coil spring retainer 34, bolt 28 and coil spring retainer nut 36.

Figure 6:
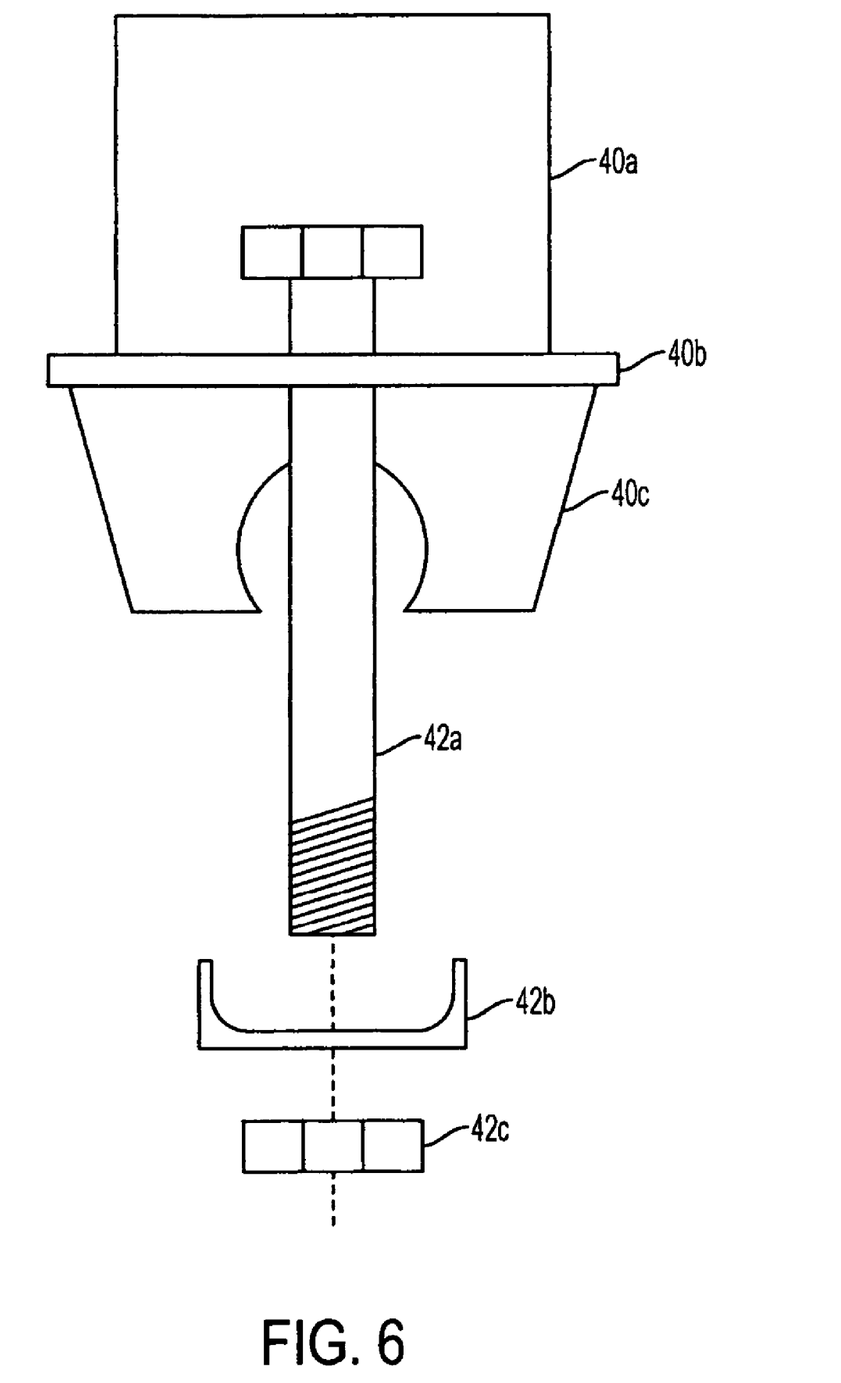
FIG. 6 is a planar front view of a platform assembly and shackle assembly according to another embodiment of the invention.

FIGS. 2A and 2B show an advantageous method of restraining coil spring 38 to insure alignment along central axis 44 that includes, by way of example but not limitation, a coil spring housing 40a and a platform assembly including platform 40b and platform supports 40c that form a triangle when placed on top of rear axle 2. Platform 40b may be a steel plate having a thickness of about ¼ inch which has a square shape with approximately six inches on each side. Platform supports 40c may be steel plates having a thickness of about ¼ inch and having lengths which are about the same as the sides of platform 40b, e.g., about 6 inches. To allow for mechanical lines that run along rear axle 2, a hemispherical cutout is made in platform supports 40c as shown in FIGS. 1 and 6.

FIG. 2B shows a break-away top view of coil spring housing 40a mounted on platform 40b with coil spring 38 being held in place by coil spring retainer 34 inside coil spring housing 40a according to the invention.

FIG. 3 shows a partial schematic of single attachment plate 33, coil spring retainer 34, bolt 28 and coil spring retainer nut 36.

FIG. 4 shows the coil spring 38 and the air spring 30 of FIG. 3 after attachment using coil spring retainer 34 and coil spring retainer nut 36.

FIG. 5 shows a planar side view and planar top view of coil spring retainer 34 according to another embodiment of the invention.

FIG. 6 shows a planar front view of a coil spring housing 40a, a platform assembly including platform 40b and platform supports 40c, and a long bolt 42a and shackle assembly including shackle 42b and shackle nut 42c according to another embodiment of the invention.

FIG. 7 shows a kit of parts in a packing container 100 of the embodiment of FIG. 3 of a suspension system according to the invention prior to being assembled and mounted in a vehicle.

In the embodiment shown in FIGS. 1 and 2A, coil spring housing 40a may be a cylindrical structure made of steel having a height of approximately 2 inches and a wall thickness of about 3/16 inch by way of example but not limitation. The coil spring housing 40a is advantageously centered on top of platform 40b and may be attached by various means such as by welding or with screws. While coil spring housing 40a is illustrated as a cylindrical structure, the invention contemplates variations in shape, such as a coil spring housing having a square shape or other shapes sufficient to house coil spring 38.

Coil spring housings 40a, platforms 40b, and platform supports 40c are installed on top of rear axle 2 on both sides of differential 8 and are secured in place by a shackle assembly that consists of a shackle 42b under rear axle 2 with holes on either end secured by long bolts 42b and shackle nut 42c. Long bolts 42b may have a length of about 7 inches by way of illustration but not limitation. Washers 42d are shown in FIG. 7 and may advantageously be used between shackle 42b and shackle nut 42c. Washers, whether illustrated or not, may advantageously be used throughout the inventive suspension system where screws and bolts are employed as known in the prior art.

An alternate method to restrain coil springs 38 and provide a platform for attachment plate 32b to rest upon when air springs 30 are inflated, has not been illustrated but features a central cylindrical core having a height of approximately 2 inches and having a diameter which is slightly smaller than the inside diameter of coil spring 38. The central cylindrical core may be a metal post or pipe but may be made of another suitable material and have a cross-sectional shape other than that of a circle. Such a central core could be attached to platforms 40b and platform supports 40c using an attachment method dependent upon the core material and shape. By way of example and not limitation, metal cylinders bolted or welded to the middle of platform 40b could be employed.

As shown in FIGS. 1 and 2A, a pair each of air springs 30, attachment plates 32a and 32b, coil springs 38, coil spring housings 40a and platforms 40b are aligned along a common central axis 44, e.g., vertically, and then mounted on top of rear axle 2 on either side of differential 8.

Air springs 30 are each attached at their top to upper support bracket 20 and at their bottom to air spring attachment plate 32a. That is, the upper structural plate 30b of each air spring 30 is attached to upper support bracket 20 and the lower structural plate 30b of each air spring 30 is attached to air spring attachment plate 32a. Coils springs 38 are attached at their top ends to coil spring attachment plate 32b by coil spring retainer 34, bolt 28 and coil spring retainer nut 36, and, at their bottom ends, are placed in respective coil spring housings 40a where they are only restrained laterally. While no additional attachment is required, coil springs 38 could be firmly attached to platform assembly 40b and 40c. Air springs 30, as extended by coil springs 38, are thus de facto "free floating" within coil spring housings 40a on top of respective platforms 40b and platform supports 40c. Respective platforms 40b and platform supports 40c are attached to rear axle 2 with shackle 42b, long bolt 42a and shackle nut 42c as shown in FIG. 2A.

The invention can be adapted for retrofit to any vehicle which has (a) a straight axle with either a leaf spring suspension, a coil spring suspension, or a strut suspension or (b) an independent rear suspension. When employed for retrofit of a vehicle with an independent rear suspension, such as a Jeep Wrangler, Chevrolet Yukon, or Nissan Pathfinder, appropriately configured brackets may be used to position one set each of coil springs and air springs over each side of the rear axle and below the vehicle floor.

The dimensions of various parts of the inventive suspension system, including but not limited to, coil spring 38, coil spring housing 40a, platforms 40b, platform supports 40c, upper support bracket 20 and bolts 28, 32c, 42a and nuts 32e, 36, 42c and the materials for such parts, will be determined based on the configuration of each vehicle, including but limited to: the existing suspension; the distance between the top of rear axle 2 and the surface of the underside of the vehicle proximate rear axle 2; the length of travel of the air spring; the width of the vehicle, the weight of the vehicle; the configuration of the underside of the vehicle; and the location of various wires, cables, pipes and tubes near the inventive suspension system and the size of differential 8. Any such permutation is within the scope of this invention.

While the specific device described is designed for retrofit on pick-up trucks, commercial trucks, buses, vans, sport utility vehicles (SUVs) and trailers, the same central axis arrangement of air springs on top of coil springs can be designed into any new vehicle that includes either a straight rear axle 2 or an independent rear suspension (not shown). The exact configuration will vary depending on the exact dimensions, bolt patterns, weight and other specifics dictated by the particular vehicle. As original equipment, mounting plates and other parts described herein including but not limited to upper support bracket 20; platform 40b, platform support 40c; coil spring housing 40a and shackle 42b may be integrated into the vehicle instead of the separate pieces described herein.

Figure 1A:
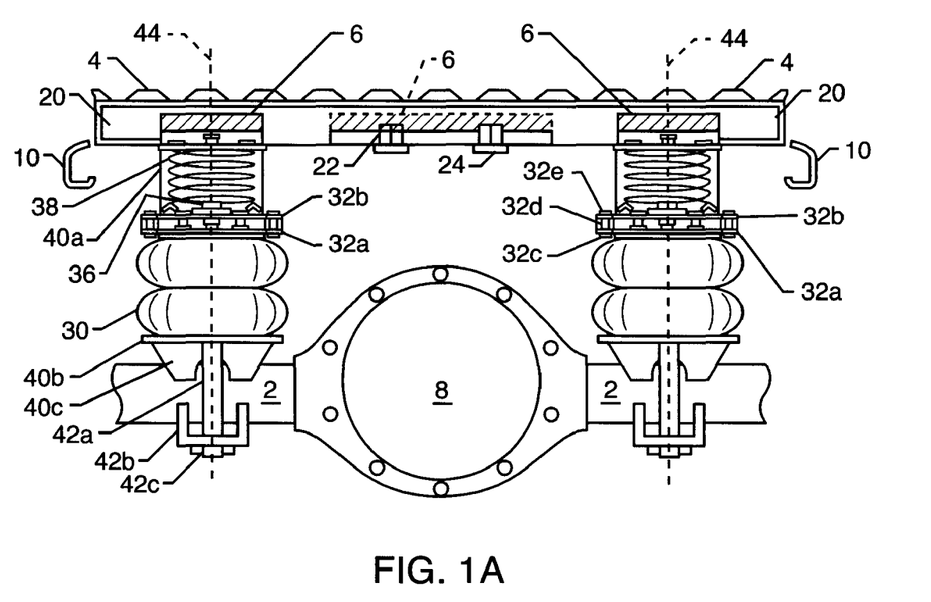
FIG. 1A is an elevational view of another embodiment of the suspension system according to the invention viewed from the rear of a vehicle with an upper support bracket partially absent.

As shown in FIG. 1A, another embodiment of the inventive suspension system positions coil springs 38 on top of air springs 30 thus reversing the relational position of coil spring housings 40a, attachment plates 32a, 32b and platform assembly 40b, 40c with required modifications to accommodate such an arrangement.

OPERATION—Under normal driving conditions, i.e., when no extra load or only a light load is present, air springs 30 are inflated with from about 5 to about 15 pounds of air pressure. Coil springs 38 are then slightly compressed and the weight of the vehicle is cushioned by the combined flexibility provided by air springs 30 and coil springs 38, thereby improving the overall ride quality. That is, in most cases 5-10 psi is not sufficient to completely collapse the coil springs into their respective housings. A minimum amount of air pressure in this application leaves the air spring pliable and does not stiffen the ride. Our observations leave us to conclude that in an unloaded vehicle the coil springs, air springs, and conventional leaf suspension work in unison for an improvement in overall ride and handling.

When heavy loads are carried or towed, air springs 30 are inflated with additional air ranging, for example, from about 10 to about 30 pounds of pressure or more if necessary. Coil springs 38 then collapse into their housings, coil spring attachment plates 32b rest on top of coil spring housings 40a and extra lift is provided solely by air springs 30 (see FIG. 1).

In the preferred embodiment, the invention will work in conjunction with a commonly available electric air compressor and tubing with pressure gauge and on/off switch placed on the dashboard or otherwise conveniently located near the driver. Commonly available sensor equipment may also be used to automatically add air when additional weight is carried or towed. Alternatively, compressed air from an outside source such as a filling station can be manually added.

While the present invention has been described in conjunction with preferred embodiments and variations thereof, one of ordinary skill after reviewing the foregoing specification will be able to effect various changes, substitutions of equivalents and other alterations without departing from the broad concepts disclosed herein. It is therefore intended that Letters Patent granted hereon be limited only by the definition contained in the appended claims and equivalents thereof.

REFERENCE NUMERALS IN DRAWINGS

20 . . . Upper Support Bracket
22 . . . Spacer
24 . . . Self-Drilling Screw
26 . . . Air Fitting
28 . . . Bolt
29 . . . Nut
30 . . . Air Spring
30a . . . Inflatable Section of Air Spring
30b . . . Structural Plate of Air Spring
32a . . . Air Spring Attachment Plate
32b . . . Coil Spring Attachment Plate
32c . . . Attachment Plate Bolt
32d . . . Attachment Plate Spacer
32e . . . Attachment Plate Nut
33 . . . Single Attachment Plate
34 . . . Coil Spring Retainer
36 . . . Coil Spring Retainer Nut
38 . . . Coil Spring
40a . . . Coil Spring Housing
40b . . . Platform
40c . . . Platform Support
42a . . . Long Bolt
42b . . . Shackle
42c . . . Shackle Nut
44 . . . Central Axis
2 . . . Axle
4 . . . Vehicle Bed
6 . . . Bed Support Channel
8 . . . Differential
10 . . . Undercarriage Frame
100 . . . Packing Container

What is claimed is:

1. A suspension system for a vehicle having a rear axle, comprising:
a plurality of spring assemblies, each spring assembly of the plurality of spring assemblies being comprised of, in combination, a coil spring having top and bottom ends and an air spring having top and bottom ends, the coil spring and the air spring arranged end-to-end in series around a common central axis such that the top end of either the coil spring or the air spring is attached to the bottom end of either the air spring or the coil spring, wherein the bottom end of either the coil spring or the air spring is attached to the rear axle of the vehicle and the top end of either the air spring or the coil spring is attached to the vehicle; and
attachment means for joining the coil spring end-to-end with the air spring of respective spring assemblies, and rear axle mounting means for one of (a) retaining the coil spring of respective spring assemblies in substantial alignment with the central axis and mounting the coil spring of respective spring assemblies above the rear axle or (b) mounting the air spring above the rear axle;
wherein the air spring comprises an inflatable section, top and bottom structural plates positioned at opposite ends of the inflatable section in opposition to one another and having a plurality of holes provided therein, and an air fitting for inflation and deflation, and wherein the attachment means comprises an attachment plate assembly positioned between the coil spring and the air spring of respective spring assemblies for joining the coil spring end-to-end with the air spring;
wherein the attachment plate assembly comprises an attachment plate to which one said structural plate of the air spring is attached and to which the coil spring is attached;
further comprising a coil spring retainer positioned between the attachment plate and the coil spring of respective spring assemblies for attaching the coil spring to the attachment plate, wherein the coil spring retainer is fixedly connected to the attachment plate, and wherein the coil spring retainer engages the coil spring and urges the coil spring against the attachment plate so that the coil spring and the air spring of respective spring assemblies are joined end-to-end, wherein the coil spring retainer has a profile which engages the coil spring, and wherein the coil spring retainer is fixedly connected to the attachment plate by at least one connection means so that the coil spring retainer urges the coil spring against the attachment plate.

2. The suspension system according to claim 1, wherein the coil spring retainer comprises a bar having a profile which is one of crimped or bent for engaging the coil spring.

3. The suspension system according to claim 1, wherein the vehicle further comprises a bed support channel, and wherein the suspension system further comprises an upper support bracket positioned between the bed support channel and the plurality of spring assemblies and attached to the bed support channel and to the plurality of spring assemblies by respective mounting means.

4. The suspension system according to claim 1, wherein the suspension system is a retrofit system and comprises a kit of parts in a packing container.

5. A suspension system for a vehicle having a rear axle, comprising:

a plurality of spring assemblies, each spring assembly of the plurality of spring assemblies being comprised of, in combination, a coil spring having top and bottom ends and an air spring having top and bottom ends, the coil spring and the air spring arranged end-to-end in series around a common central axis such that the top end of either the coil spring or the air spring is attached to the bottom end of either the air spring or the coil spring, wherein the bottom end of either the coil spring or the air spring is attached to the rear axle of the vehicle and the top end of either the air spring or the coil spring is attached to the vehicle; and attachment means for joining the coil spring end-to-end with the air spring of respective spring assemblies, and rear axle mounting means for one of (a) retaining the coil spring of respective spring assemblies in substantial alignment with the central axis and mounting the coil spring of respective spring assemblies above the rear axle or (b) mounting the air spring above the rear axle;

wherein the air spring comprises an inflatable section, top and bottom structural plates positioned at opposite ends of the inflatable section in opposition to one another and having a plurality of holes provided therein, and an air fitting for inflation and deflation, and wherein the attachment means comprises an attachment plate assembly positioned between the coil spring and the air spring of respective spring assemblies for joining the coil spring end-to-end with the air spring; and wherein the attachment plate assembly comprises a pair of opposed attachment plates including an air spring attachment plate to which one said structural plate of the air spring is attached and a coil spring attachment plate to which the coil spring is attached, said opposed attachment plates being spaced apart and joined by connection means.

6. The suspension system according to claim 5, further comprising a coil spring retainer positioned between the coil spring attachment plate and the coil spring of respective spring assemblies for attaching the coil spring to the coil spring attachment plate, wherein the coil spring retainer is fixedly connected to the coil spring attachment plate, and wherein the coil spring retainer engages the coil spring and urges the coil spring against the coil spring attachment plate so that the coil spring and the air spring of respective spring assemblies are joined.

7. The suspension system according to claim 6, wherein the coil spring retainer has a profile which engages the coil spring, and wherein the coil spring retainer is fixedly connected to the coil spring attachment plate by at least one connection means so that the coil spring retainer urges the coil spring of respective spring assemblies against the coil spring attachment plate.

8. The suspension system according to claim 7, wherein the coil spring retainer is a bar having a profile which is one of crimped or bent for engaging the coil spring.

9. A suspension system for a vehicle having a rear axle, comprising:

a plurality of spring assemblies, each spring assembly of the plurality of spring assemblies being comprised of, in combination, a coil spring having top and bottom ends and an air spring having top and bottom ends, the coil spring and the air spring arranged end-to-end in series around a common central axis such that the top end of either the coil spring or the air spring is attached to the bottom end of either the air spring or the coil spring, wherein the bottom end of either the coil spring or the air spring is attached to the rear axle of the vehicle and the top end of either the air spring or the coil spring is attached to the vehicle;

attachment means for joining the coil spring end-to-end with the air spring of respective spring assemblies, and rear axle mounting means for one of (a) retaining the coil spring of respective spring assemblies in substantial alignment with the central axis and mounting the coil spring of respective spring assemblies above the rear axle or (b) mounting the air spring above the rear axle, wherein the rear axle mounting means retains the coil spring of respective spring assemblies in substantial alignment with the central axis and mounts the coil spring of respective spring assemblies above the rear axle, and wherein the rear axle mounting means comprises a coil spring housing configured to accept at least a portion of the coil spring therein and provide substantial alignment of the coil spring with the central axis, a platform onto which the coil spring housing is positioned and attached, and a platform support positioned over the rear axle and removably connected thereto and connected to the platform so that the coil spring of respective spring assemblies are mounted above the rear axle; and long bolt and shackle means removably connecting the platform support to the rear axle for respective spring assemblies, and wherein said long bolt and shackle means comprises a plurality of long bolts, a plurality of shackles and a plurality of nuts.

10. A suspension system for a vehicle having a rear axle, comprising:

a plurality of spring assemblies, each spring assembly of the plurality of spring assemblies being comprised of, in combination, a coil spring having top and bottom ends and an air spring having top and bottom ends, the coil spring and the air spring arranged end-to-end in series around a common central axis such that the top end of either the coil spring or the air spring is attached to the bottom end of either the air spring or the coil spring, wherein the bottom end of either the coil spring or the air spring is attached to the rear axle of the vehicle and the top end of either the air spring or the coil spring is attached to the vehicle;

attachment means for joining the coil spring end-to-end with the air spring of respective spring assemblies, and rear axle mounting means for one of (a) retaining the coil spring of respective spring assemblies in substantial alignment with the central axis and mounting the coil spring of respective spring assemblies above the rear axle or (b) mounting the air spring above the rear axle, wherein the rear axle mounting means mounts the air spring of respective spring assemblies above the rear axle, wherein the rear axle mounting means comprises a platform onto which the air spring is attached and a platform support positioned over the rear axle and removably connected thereto and connected to the platform so that the air spring of respective spring assemblies are mounted above the rear axle, wherein the suspension system further comprises an upper support bracket mounted to the vehicle and respective coil spring housings attached to the upper support bracket, and wherein the coil springs of respective spring assemblies are positioned within respective coil spring housings; and long bolt and shackle means removably connecting the platform support to the rear axle for respective spring assemblies, and wherein said long bolt and shackle means comprises a plurality of long bolts, a plurality of shackles and a plurality of nuts.

11. In a vehicle having a rear axle and one of a traditional leaf spring, coil spring, strut, or independent suspension, the improvement comprising: an additional independent suspension not physically associated with the traditional leaf spring, coil spring, strut, or independent suspension system, comprised of a plurality of spring assemblies, each spring assembly comprising, in combination, a coil spring having top and bottom ends and an air spring having top and bottom ends, the coil spring and the air spring arranged end-to-end in series along a common central axis such that the top end of either the coil spring or the air spring is attached to the bottom end of either the air spring or the coil spring, wherein the bottom end of either the coil spring or the air spring is attached to the rear axle of the vehicle and the top end of either the air spring or the coil spring is attached to the vehicle, and wherein no other structure extends along the common central axis between the rear axle and the vehicle.

12. A suspension system for a vehicle having a rear axle, comprising:
   a spring assembly being comprised of a coil spring and an air spring paired end-to-end in series such that a top end of either the coil spring or the air spring is attached to a bottom end of the paired coil spring or air spring, the spring assembly being mounted above the rear axe of the vehicle, wherein the air spring comprises an inflatable section, top and bottom structural plates positioned at opposite ends of the inflatable section in opposition to one another and having a plurality of holes provided therein, and an air fitting for inflation and deflation;
   an attachment plate assembly for joining the coil spring end-to-end with the paired air spring, wherein the attachment plate assembly comprises an attachment plate to which one said structural plate of the air spring is attached and to which the coil spring is attached;
   a coil spring retainer positioned between the attachment plate and the coil spring for attaching the coil spring to the attachment plate, wherein the coil spring retainer is connected to the attachment plate, engages the coil spring and urges the coil spring against the attachment plate so that the coil spring and the air spring of respective spring assemblies are joined end-to-end, wherein the coil spring retainer has a profile which engages the coil spring, and wherein the coil spring retainer is connected to the attachment plate by at least one connection means so that the coil spring retainer urges the coil spring against the attachment plate; and
   rear axle mounting means for one of (a) mounting the coil spring above the rear axle or (b) mounting the air spring above the rear axle.

13. The suspension system according to claim 12, wherein the coil spring retainer comprises a bar having a profile which comprises one of crimped or bent for engaging the coil spring.

14. A suspension system for a vehicle having a rear axle, comprising:
   a spring assembly being comprised of a coil spring and an air spring paired end-to-end in series such that a top end of either the coil spring or the air spring is attached to a bottom end of the paired coil spring or air spring, the spring assembly being mounted above the rear axle of the vehicle, wherein the air spring comprises an inflatable section, top and bottom structural plates positioned at opposite ends of the inflatable section in opposition to one another and having a plurality of holes provided therein, and an air fitting for inflation and deflation;
   an attachment plate assembly for joining the coil spring end-to-end with the paired air spring, wherein the attachment plate assembly comprises a pair of opposed attachment plates including an air spring attachment plate to which one said structural plate of the air spring is attached, and a coil spring attachment plate to which the coil spring is attached, said opposed attachment plates being spaced apart and joined by connection means; and
   rear axle mounting means for one of (a) mounting the coil spring above the rear axle or (b) mounting the air spring above the rear axle.

15. The suspension system according to claim 14, further comprising a coil spring retainer positioned between the coil spring attachment plate and the coil spring for attaching the coil spring to the coil spring attachment plate, wherein the coil spring retainer is connected to the coil spring attachment plate, and wherein the coil spring retainer engages the coil spring and urges the coil spring against the coil spring attachment plate so that the coil spring and the air spring are joined.

16. The suspension system according to claim 15, wherein the coil spring retainer has a profile which engages the coil spring, and wherein the coil spring retainer is connected to the coil spring attachment plate by at least one connection means so that the coil spring retainer urges the coil spring of respective spring assemblies against the coil spring attachment plate.

17. The suspension system according to claim 16, wherein the coil spring retainer comprises a bar having a profile which is one of crimped or bent for engaging the coil spring.

18. A suspension system for a vehicle having a rear axle, comprising:
   a spring assembly being comprised of a coil spring and an air spring paired end-to-end in series such that a top end of either the coil spring or the air spring is attached to a bottom end of the paired coil spring or air spring, the spring assembly being mounted above the rear axle of the vehicle, wherein the air spring comprises an inflatable section, top and bottom structural plates positioned at opposite ends of the inflatable section in opposition to one another and having a plurality of holes provided therein, and an air fitting for inflation and deflation;
   an attachment plate assembly for joining the coil spring end-to-end with the paired air spring; and
   rear axle mounting means for one of (a) mounting the coil spring above the rear axle or (b) mounting the air spring above the rear axle;
   wherein the rear axle mounting means retains the coil spring in substantial alignment with the air spring and mounts the coil spring above the rear axle, and wherein the rear axle mounting means comprises a coil spring housing configured to accept at least a portion of the coil spring therein and provide substantial alignment of the coil spring with the air spring, a platform onto which the coil spring housing is positioned and attached, and a platform support positioned over the rear axle and removably connected thereto and connected to the platform so that the coil spring is mounted above the rear axle, the suspension system further including long bolt and shackle means removably connecting the platform support to the rear axle, wherein said long bolt and shackle means comprises a plurality of long bolts, a plurality of shackles and a plurality of nuts.

19. A suspension system for a vehicle having a rear axle, comprising:
- a spring assembly being comprised of a coil spring and an air spring paired end-to-end in series such that a top end of either the coil spring or the air spring is attached to a bottom end of the paired coil spring or air spring, the spring assembly being mounted above the rear axle of the vehicle, wherein the air spring comprises an inflatable section, top and bottom structural plates positioned at opposite ends of the inflatable section in opposition to one another and having a plurality of holes provided therein, and an air fitting for inflation and deflation;
- an attachment plate assembly for joining the coil spring end-to-end with the paired air spring; and
- rear axle mounting means for one of (a) mounting the coil spring above the rear axle or (b) mounting the air spring above the rear axle;
- wherein the rear axle mounting means mounts the air spring above the rear axle, wherein the rear axle mounting means comprises a platform onto which the air spring is attached and a platform support positioned over the rear axle and removably connected thereto and connected to the platform so that the air spring is mounted above the rear axle, the suspension system further comprising an upper support bracket mounted to the vehicle and the coil spring housing is attached to the upper support bracket, and wherein the coil spring is positioned within the coil spring housing, the suspension system further including long bolt and shackle means removably connecting the platform support to the rear axle, wherein said long bolt and shackle means comprises a plurality of long bolts, a plurality of shackles and a plurality of nuts.

20. The suspension system according to claim 19, wherein the suspension system is a retrofit system and comprises a kit of parts in a packing container.

* * * * *